(12) United States Patent
Brown et al.

(10) Patent No.: US 12,037,464 B2
(45) Date of Patent: Jul. 16, 2024

(54) NON-AQUEOUS DISPERSANTS

(71) Applicant: INDORAMA VENTURES OXIDES AUSTRALIA PTY LIMITED, Brooklyn (AU)

(72) Inventors: Rowan Brown, Altona (AU); Paul Dumanski, Murrumbeena (AU)

(73) Assignee: Indorama Ventures Oxides Australia Pty Limited, Brooklyn (AU)

( * ) Notice: Subject to any disclaimer, the term of this patent is extended or adjusted under 35 U.S.C. 154(b) by 1030 days.

(21) Appl. No.: 16/963,594

(22) PCT Filed: Feb. 19, 2019

(86) PCT No.: PCT/AU2019/000020
§ 371 (c)(1),
(2) Date: Jul. 21, 2020

(87) PCT Pub. No.: WO2019/161431
PCT Pub. Date: Aug. 29, 2019

(65) Prior Publication Data
US 2021/0061959 A1   Mar. 4, 2021

(30) Foreign Application Priority Data
Feb. 26, 2018 (AU) ................... 2018900608

(51) Int. Cl.
*C08G 81/00* (2006.01)
*A01N 25/04* (2006.01)
*C08G 81/02* (2006.01)

(52) U.S. Cl.
CPC ........... *C08G 81/027* (2013.01); *A01N 25/04* (2013.01)

(58) Field of Classification Search
CPC .................. C08G 81/027; A01N 25/04
(Continued)

(56) References Cited

U.S. PATENT DOCUMENTS 5,300,255 A * 4/1994 Campbell ............... C10L 1/328
516/77
5,849,676 A * 12/1998 Harrison ................. C10L 10/04
508/291

FOREIGN PATENT DOCUMENTS

JP   2000319333 A  * 11/2000
JP   2000319333 A    11/2000
(Continued)

OTHER PUBLICATIONS

B. Muller, "Stabilization of Aluminum Pigments in Aqueous Alkaline Media by Styrene Copolymers", (J.Coatings Technology, vol. 67, No. 846, Jul. 1995, pp. 59-62) (Year: 1995).*
(Continued)

*Primary Examiner* — Ling Siu Choi
*Assistant Examiner* — Ronald Grinsted
(74) *Attorney, Agent, or Firm* — Christensen, Fonder, Dardi & Herbert, PLLC

(57) ABSTRACT

A non-aqueous dispersant ("NAD") prising may include a condensate formed by the grafting of an adduct of a hydrophobic stabilising entity ("HSE"), which may include polyhydroxystearic acid ("PHSA"), polyisobutylene succinic anhydride (PIBSA), and polycaprolactone, with a linker substrate selected from the group consisting of a glycol, an alkanolamine, an ether amine, and an ethylene amine onto a co-polymer in an effective reaction stoichiometry, wherein where the co-polymer comprises an anchoring moiety having an aromatic functionality is a styrene-maleic anhydride (SMA) co-polymer.

17 Claims, 3 Drawing Sheets

(58) Field of Classification Search
USPC .......................................................... 528/361
See application file for complete search history.

(56) References Cited

FOREIGN PATENT DOCUMENTS

WO          01/21298 A1      3/2001
WO          WO-0121298 A1 *  3/2001   ............ B01F 17/005

OTHER PUBLICATIONS

International Search Report issued by the Australian Patent Office on May 20, 2019 in connection with International Application No. PCT/AU2019/000020, 5 pages.
Written Opinion of the International Searching Authority issued by the Australian Patent Office on May 20, 2019 in connection with International Application No. PCT/AU2019/000020, 5 pages.

* cited by examiner

EXAMPLE 8A: TERSPERSE® 4850

MAJOR FLOCCULATION

EXAMPLE 8B: HYPERMER® LP-3

MINOR FLOCCULATION

EXAMPLE 8G: DS 11144

MODERATE FLOCCULATION

EXAMPLE 8H: DS 11114

NO FLOCCULATION

EXAMPLE 8J: DS 11145

NO FLOCCULATION

EXAMPLE 8L: DS 11146

NO FLOCCULATION

EXAMPLE 8M: DS 11224

NO FLOCCULATION

NON-AQUEOUS DISPERSANTS

CROSS REFERENCE TO RELATED APPLICATIONS

This application is a National Phase of International Application No. PCT/AU2019/000020 filed on Feb. 19, 2019, which designated the United States of America, and which claims the foreign priority benefit of corresponding Australian Patent Application No. 2018900608 filed on Feb. 26, 2018. The entire contents of the aforementioned applications are incorporated by reference herein.

FIELD OF THE INVENTION

The invention generally relates to the dispersion of finely divided pesticides in a liquid, specifically non-aqueous liquids, where robust and effective dispersion is critical to optimal performance and stability of resultant formulations. The primary formulations of interest are non-aqueous pesticidal compositions, such those designated by CropLife International as oil-miscible flowable concentrates ("OF"), and more particularly, oil dispersions ("OD"). It will be convenient to hereinafter describe the invention in relation to the dispersion of solid, finely divided pesticides in non-aqueous liquids and to the use of condensate derivatives of polyhydroxystearic acid ("PHSA") therein, which display improvements in dispersion stability. However, the invention is not to be taken to be limited to PHSA derivatives.

BACKGROUND TO THE INVENTION

There are numerous challenges facing a formulator seeking to prepare a stable dispersion of a finely divided pesticide in a non-aqueous liquid. These challenges are often the basis of troublesome shelf-life stability behaviours that often characterise agrochemical OD formulations. One of the primary challenges is the ability to effectively disperse the active ingredient in a non-aqueous medium, particularly an oil-based medium, success of which is fundamental to OD stability by helping to prevent sedimentation and syneresis over the storage period, and ultimately, thereby allowing the end user to easily transfer the formulation from the container to the application vessel.

Stable dispersion of solid, finely divided pesticides in non-aqueous liquids is typically facilitated by use of specific non-aqueous dispersants ("NAD"), which typically contain one or more oil-soluble, lipophilic or oleophilic moieties, and a suitable anchoring moiety. The lipophilic moiety tends to be soluble in the external phase into which it will typically extend, forming an effective steric barrier, while the anchoring moiety should strongly adsorb onto the disperse phase.

The key element for effective stabilization of pesticidal suspensions in anon-aqueous liquid by use of a specialty dispersing agent, is arguably the affinity or compatibility of the dispersing agent's anchoring moiety with the disperse phase. It is not surprising that a lack of synergy may ultimately result in a lack of sufficient adsorption to the desired substrate, gradual desorption of dispersing agent from the substrate and/or excessive solubility of the dispersing agent in the external phase. Should any of these behaviours occur, this will tend to result in flocculation, sedimentation, phase separation, shear thickening or dilatancy and/or complex associative thickening phenomena in complete formulated examples.

However, when dealing with the dispersion of pesticides in non-aqueous liquids, this aspect of dispersant performance must be considered in parallel with the notion that most pesticides are organic rather than inorganic, with significant variation in polarity typically ranging from low to reasonably high. Due to the lower-energy surfaces often provided by the interface of finely divided pesticide, it can be difficult for the anchoring moiety of a dispersant to associate effectively and yield optimal dispersing effect in the non-aqueous system.

In the first instance, a difficulty arises from the amphipathic character employed by typical dispersants where, in the case of a non-aqueous dispersion, the anchoring moiety will often be hydrophilic. One could easily envisage that low-to-moderately polar organic substrates will be thermodynamically incompatible, wherein the dispersant is at risk of either poorly adsorbing or desorbing, and thus the possibility of subsequent destabilisation of the dispersion or suspension may increase. In the second instance, by introduction of better suited and potentially less hydrophilic binding functionality to improve a dispersant's adsorption potential, the subsequent reduction in amphipathic character may hinder the thermodynamic component of adsorption through potentially improved solvation by the external phase.

These concepts are further magnified in agrochemical OD formulation technology due to the requirement that the formulations are designed to be diluted in water prior to application. Unlike purely non-aqueous systems employed in agrochemical OF-type systems, emulsifiers must be added to facilitate this requirement. However, the presence of these polar, inter-facially active additives provides a further destabilising influence, wherein NAD adsorption can be impacted by solubilization of the anchoring moiety, or the NAD could foreseeably also be displaced. These occurrences ultimately provide additional incentive for the NAD to desorb, where the subsequent pesticidal OD formulation will no longer be shelf-stable.

One method of potentially overcoming this issue is the employment of synergists or dispersion synergists. These materials aim to adsorb on the disperse phase and provide a more suitable bridging interface, to provide better compatibility with the anchoring moiety of the NAD. However, the use of a synergist adds unwanted complexity from both developmental and commercial perspectives.

Alternatively, another method for overcoming this challenge is the use of high-performance polymeric NADs, where the anchoring moiety possesses greater specificity for agrochemical substrates to be dispersed, ideally through the incorporation of common functionality, or the incorporation of features which may provide adsorbing utility across a broad range of substrates. High-performance polymeric NADs which possess excellent utility are particularly those of the comb-type: these materials contain a suitable anchoring backbone upon which multiple stabilising side-chains are covalently linked.

The agrochemical formulator does have access to advanced polymeric NAD technology. The peak examples of suitable art are comb-type polymeric NADs TERSPERSE® 4890, which is available from Huntsman Corporation, or SOLSPERSE® 13940, which is available from The Lubrizol Corporation. However, the chemistry employed in the anchoring architecture of these materials, whilst providing robust and universal adsorption behaviour, is unfavourable with respect to agrochemical regulatory considerations. Of particular note, are low-risk polymer definitions, such as those provided by the United States Environmental Protection Authority Title 40 Code of Federal Regulations (40 CFR), specifically 40 CFR § 723.250. Alternate strategies are therefore required to prepare similar high-performance NADs which exhibit similar performance, but which still fall inside the limits of any commercially disadvantageous regulatory restrictions and with industrial advantage, or manufacturing simplicity in mind.

As such, the present inventors have examined the utility of comparatively hydrophobic anchoring architecture, which fundamentally complements low to moderate polarity organic pesticidal substrates, but which use is not immediately intuitive due to the impact upon dispersant amphipathic character and subsequent effect with respect to adsorption potential.

Therefore, with the aim of improving the accessibility of OD formulation technology, which promises to provide a more effective delivery vehicle for pesticides by way of the non-aqueous external phase of OD formulations which yields adjuvancy in-can, the present inventors have found that notionally less-amphiphilic, or relatively more hydrophobic non-aqueous dispersants display surprisingly robust dispersion performance. This has been shown by way of substantial improvement in millbase concentrate rheological behaviour, which is suggested to result from improved affinity between dispersant anchor and the disperse phase. This improvement is expected to help facilitate greater OD formulation stability in contrast to existing technology, while these materials are also easier to handle and maintain superior solubility in contrast to other dispersing agents often employed in the stabilization of non-aqueous dispersions.

Improved delivery themes such as this are of growing importance as the potency of the existing finite set of commercially available pesticides dwindles through issues such as resistance, and as newer, more complex technologies suffer from decreasing bioavailability.

The present invention seeks to ameliorate at least one of the problems encountered in the prior art.

SUMMARY OF THE INVENTION

According to one aspect of the present invention, there is provided a non-aqueous dispersant ("NAD") comprising a condensate formed by the grafting of an adduct of a hydrophobic stabilising entity ("HSE") onto a co-polymer in an effective reaction stoichiometry, wherein the co-polymer comprises an anchoring moiety having an aromatic functionality.

In this Specification, the skilled person will understand that the term "condensate" as used hereinafter means a product obtained following any reaction including an addition reaction, a condensation reaction or a substitution reaction.

The term "hydrophobic stabilising entity" will be understood by the skilled reader to mean a suitably hydrophobic, or alternatively solvent- or oil-compatible, polymeric, oligomeric or otherwise, material of a suitable molecular weight, which will typically have a molecular weight of 1000 Da or greater, that can provide or facilitate non-aqueous dispersion characteristics through mechanisms of steric stabilisation, either on its own, or when modified through reaction, condensation or otherwise with suitable reagents.

The term "co-polymer" is to be understood as meaning a polymer made by reaction of two or more monomer species.

The term "macromonomer" is to be understood as meaning a macromolecule with at least one end group that enables it to act as a monomer, such as an ethylenic double bond, thus enabling the macromolecule to participate in polymerisation reactions. As used herein, in the context of polymeric dispersants, whether aqueous or non-aqueous, the macromolecule is typically a stabilising entity that facilitates dispersion characteristics through mechanisms of steric stabilisation, i.e., a hydrophobic stabilising entity, such as polyhydroxystearic acid ("PHSA").

The term "acid value" is to be understood as meaning the mass of potassium hydroxide in milligrams, required to neutralise one gram of a chemical substance. It shall be determined by accurately weighing a representative mass of the sample that is to be examined into a conical flask. The dissolution solvent is then prepared as 1:1 toluene:ethanol (v/v), made up to 100m1 volume. To this, 5 drops of 1% phenolphthalein indicator solution are added followed by a few drops of 0.1M KOH (in methanol) until the first sign of a pink colour is noticed. The dissolution solvent is then combined with the sample to be examined and when the sample is fully dissolved, where heat may be required to assist in dissolution, the solution is titrated with standardised 0.1M methanolic KOH. The acid value is determined using the following equation: Acid Value=(T×M×56.1)/W, where T is the titre in mL; M is the molarity of the standardised KOH in methanol solution; and W is the weight of the sample in grams. Accordingly, the units for Acid Value are mg KOH/g.

As understood by the skilled person, the term "acid value" can be used to determine guide molecular weights for a polymer, if the number of acid functional groups of a single polymer molecule is known or can be defined. That is, for PHSA, the general formula is MW=A*56100/AV, where A=the number of acidic groups, 56,100 units are milliequivalents KOH or mg KOH/mol, and AV is mg KOH/g. By simple rearrangement, a molecular weight approximation can be obtained in g/mol.

The HSE is preferably selected from polyhydroxystearic acid ("PHSA"), polyisobutylene succinic anhydride ("PIBSA"), polycaprolactone, or the like, wherein derivatives of the adduct having specific molecular weight ranges are formed. Most preferably, the HSE is PHSA, having a molecular weight of greater than 1000 Da.

Prior to reaction with a co-polymer in an effective reaction stoichiometry, the HSE, such as PHSA, is preferably first modified through reaction with a linker substrate, which is selected from a glycol, an alkanolamine, an ether amine or an ethylene amine. In this way, the HSE can be suitably prepared for grafting onto the co-polymer. In a further preferred form, the linker substrate is selected from a polyoxyalkylene, such monoethylene glycol ("MEG"), diethylene glycol ("DEG"), triethylene glycol ("TEG"), polyethylene glycol ("PEG"), or a polyoxyalkylene, wherein in the formula $HO[—CH_2—CH—R—O—]_n—H$, R=H or $CH_3$ and n=1-100; or a glycolamine, such as diglycolamine ("DGA") or triglycolamine ("TGA") and the like; or a polyetheramine, such as one selected from the JEFFAMINE D series, i.e., an amine-terminated polyoxypropylene, or JEFFAMINE' ED series, i.e., a diamine with a predominantly polyethylene glycol backbone having terminal amines, or 4-hydroxyaniline, or monoethanolamine ("MEA"), or monoisopropanolamine ("MIPA"), ethylenediamine ("EDA"), triethylenetetramine ("TETA"), or tetraethylenepentamine ("TEPA"). Most preferably, the HSE is PHSA and the graft-facilitating linker substrate is MEA, wherein the HSE adduct is PHSA-monoethanolamide.

Similarly, the use of derivatives of an adduct comprising polyisobutylene succinic anhydride ("PIBSA"), particularly PIBSA reacted with a glycolamine, such as DGA or TGA, a monoethanolamine ("MEA"), an ethylenediamine, or a polyetheramine, such as one selected from the JEFFAM- INE® D or ED series, or 4-hydroxyaniline, may also advantageously afford the same effect. In the case of polycaprolactone, the derivative of the adduct can typically be formed by the reaction of caprolactone with a suitable fatty alcohol or fatty amine yielding a product with a suitable molecular weight greater than 1000 Da, which can be directly grafted to a suitable co-polymer.

In another preferred form, the adduct of the HSE is prepared from a condensation reaction, under appropriate conditions, of PHSA with N-hydroxyethyl acrylamide ("HEAA"), N-hydroxyethyl methacryl amide ("HEMAm"), 2-hydroxyethyl acrylate ("HEA"), 2-hydroxyethyl methacrylate ("HEMA"), 4-vinylaniline, 4-vinylphenol, allylalcohols, such as 2-propen-1-ol and the like, or allylamines, such as 3-amino-1-propene and the like, to form a resultant macromonomer, having an ethylenically unsaturated terminus, which can be further co-polymerised with monomers, selected from styrene, maleic anhydride, methacrylic acid or methyl methacrylate, via typical radical polymerisation techniques. Although the resultant reaction product is not structurally identical to the preferred embodiment, it is expected to display similar application performance.

Similar application effects may also be achieved through replacing the desired HSE adduct with simple fatty alcohols, such as $C_6$ to $C_{22}$, saturated and mono- and poly-unsaturated; and fatty amines, such as $C_{12}$ to $C_{22}$, saturated and mono- and poly-unsaturated. However, their smaller molecular weight will likely reduce their effectiveness as a HSE substitute due to insufficient steric characteristics.

Preferably, the PHSA used in the pre-condensation with monoethanolamine will ideally have a molecular weight of greater than 1000 Da, as determined by an acid value of about 25 to 50 mg KOH/g.

In one preferred form, wherein the aromatic functionality of the anchoring moiety of the co-polymer is provided by a styrene-maleic anhydride ("SMA") co-polymer, the preferred SMA co-polymer being SMA®-1000 (Polyscope Polymers By), having a styrene:maleic anhydride ratio of 1:1. However, the co-polymer can also be selected from SMA®-2000 (Polyscope Polymers BV), having a styrene:maleic anhydride ratio of 2:1; SMA®-3000 (Polyscope Polymers BV), having a styrene:maleic anhydride ratio of 3:1; SMA® EF 40, 60 and 80 (Polyscope Polymers BV), wherein the SMA co-polymer is reacted with the adduct of the HSE to form the condensate in a stoichiometric ratio range of from 1:1 to 8:1 and in a molecular weight (Mn) range of 1000 to 20000 Da.

While the use of SMA co-polymer is preferred, the present invention is also directed to the use of alternatives having an aromatic functionality, including co-polymers of styrene, α-methyl-styrene and the like, which form adducts with acrylic acid, crotonic acid, itaconic acid, methacrylic acid and methyl methacrylate.

In a most preferred form, the condensate of the present invention has acidic and/or anionic character. The most preferred NAD, which gives rise to improved performance, is one where the condensate is both acidic and anionic in nature, and where it includes the anchoring moiety having aromatic functionality. This is achieved through adjusting the stoichiometry of the PHSA-monoethanolamide adduct to less than stoichiometric equivalence based upon the acid equivalents of the co-polymer, where residual acidity can be further neutralised with suitable alkaline/basic reagents to form the desired salt, if required.

In another preferred form, by adjusting the reaction stoichiometry, the condensate further includes sulfonic, phosphonic or phosphoric acid functionality. In one form, this is achieved through co-condensation of an adduct of the HSE and at least one sulphonate-, phosphate-, or phosphonate-bearing graft agent with a co-polymer. In a more preferred form, the stoichiometry of PHSA-monoethanolamide adduct can be reduced to less than stoichiometric equivalence based upon the acid equivalents of the co-polymer to allow for co-condensation of sulphonic, phosphonic or phosphoric acid-bearing reagents. The sulphonic acid-bearing reagents are preferably selected from taurine, isethionic acid, 4-aminobenzenesulphonic acid, 4-hydroxybenzenesulphonic acid or 1-hydroxy-2-propanesulfonic acid or any of their respective salts. Phosphonic- or phosphoric-bearing reagents are preferably selected from aminomethylphosphonic acid, aminoethylphosphonic acid, phosphorylethanolamine, or any of their respective salts. A condensate achieved by the use of un-neutralised acid-bearing reagents can be later neutralised with suitable alkaline/basic reagents to form the desired salt, if required.

In another preferred form, a similarly functional non-grafted reaction product can also be derived from the use of an aforementioned macromonomeric HSE via the condensation of PHSA with HEAA, where the ethylenically unsaturated terminus can be co-polymerised with appropriate amounts of monomers selected from styrene, methacrylic acid, crotonic acid, itaconic acid, maleic anhydride, methacrylic acid, methyl methacrylate or 2-acrylamido-2-methylpropane sulfonic acid via typical radical polymerisation techniques.

In another preferred form, for the preferred PHSA-monoethanolamide, the HSE adduct may be grafted directly onto existing commercially available co-polymers prepared from, but not limited to, styrene or adducts of styrene with maleic anhydride or the like, or with 2-acrylamido-2-methylpropane sulfonic acid or the like.

Development of examples containing residual amounts of sulfonic acid moieties grafted to the aromatic-containing backbone anchor have shown even further increases in apparent substrate affinity and thus improved stabilisation of particularly troublesome disperse phases. This method for introducing residual levels of anionic character into the anchoring moiety is particularly practical, since the presence of excessive anionic character in a dispersing agent when used in an aliphatic system, albeit potentially beneficial in terms of dispersion stability, can provide limitations. These are mostly related to limited solubility, potential undesirable rheological phenomena, and poor handling traits owing to the potential grease-like behaviour of anionic-rich NADs.

The present invention has exhibited marked improvements in the non-aqueous dispersion stability of particularly troublesome organic pesticide chemistries. It is postulated that this may provide for subsequent improvements in overall formulation stability, which has been an industry-wide issue preventing mainstream adoption of OD technology. The main advantages of the present invention relate to significantly improved stability of dispersions of finely divided pesticides in a non-aqueous liquid, which subsequently improves the stability of resultant OD formulations.

The improvement in dispersion performance has been identified through visual and rheological observations of non-aqueous pesticidal millbase concentrates. The key improvements achieved through the use of the preferred reaction products as described by the present disclosure include significant reduction in visible flocculation as observed by "falling film" subjective Tyndall scattering ratings and microscopy; improvements in concentrate stability, i.e., lack of unusual destabilisation effects which manifest as a paste or a mustard-like appearance; consistent reduction in the viscosity of millbase concentrates as observed by rheological examination, which is indicative of improved dispersant performance.

BRIEF DESCRIPTION OF FIGURES

In order that the invention may be readily understood and put into practical effect, reference will now be made to embodiments of the present invention with reference to the accompanying figures. The figures are provided by way of example only.

DETAILED DESCRIPTION OF THE INVENTION

Figure 1:
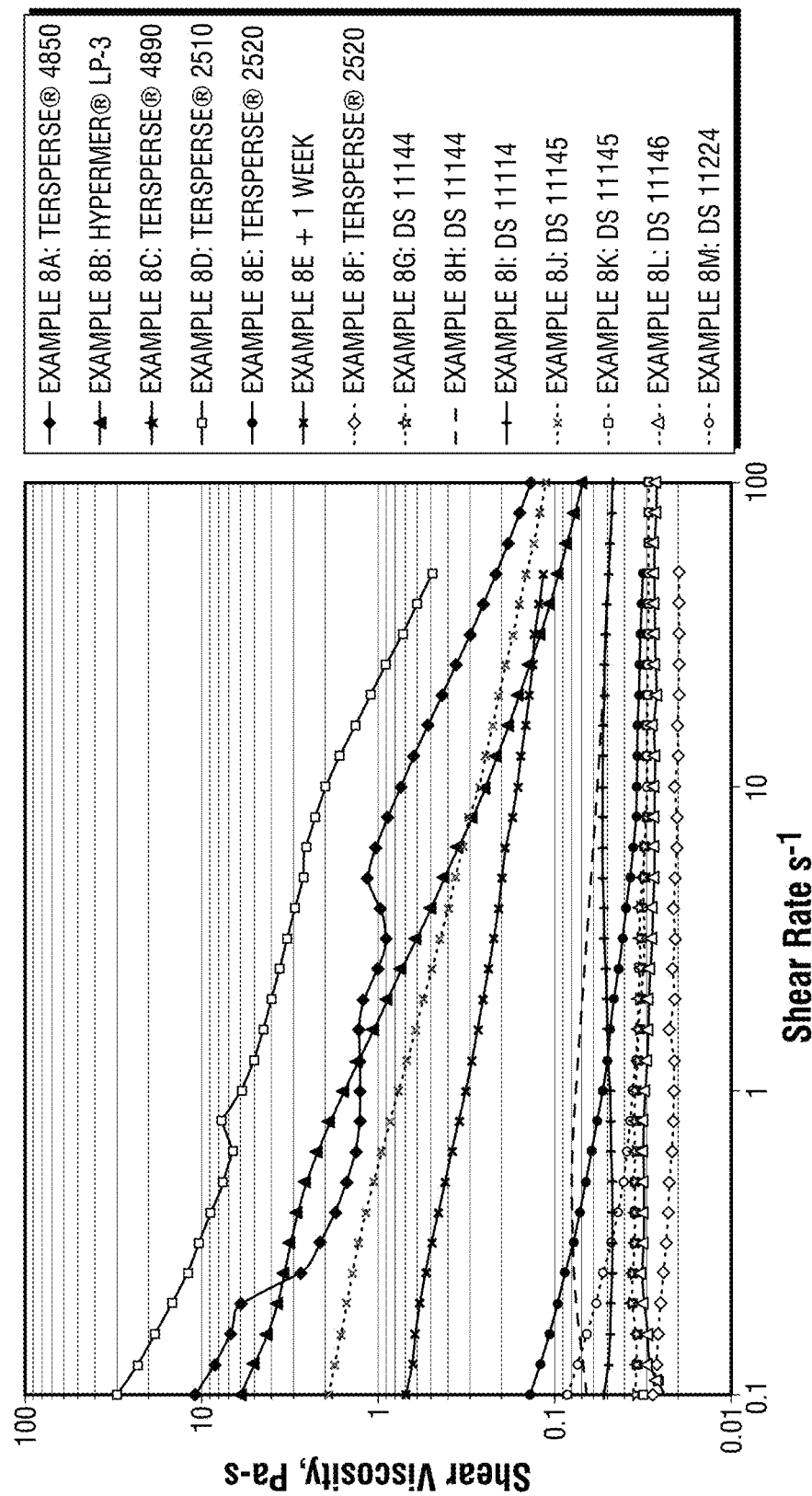
FIG. 1 is a graph showing rheological comparisons of millbase concentrates, as exemplified in Examples 8A through to 8M.

In its most preferred form, the condensate is the reaction product of the condensation between PHSA-monoethanolamide adduct and a co-polymer of styrene-maleic anhydride ("SMA"), where the preferred co-polymer is SMA-1000 (Polyscope Polymers BV) having a styrene:maleic anhydride ratio of 1:1 and Mn=2100 g/mol. The stoichiometry of PHSA-monoethanolamide adduct is equivalent to, or is most preferably reduced to, less than stoichiometric equivalence based upon the acid value of the co-polymer. PHSA used in the pre-condensation with MEA will ideally have a molecular weight of greater than 1000 g/mol, as determined by an acid value of about 25 to 50 mg KOH/g.

Most preferably, the stoichiometry of PHSA-monoethanolamide adduct is reduced to less than stoichiometric equivalence based upon the acid value of the co-polymer to allow for co-condensation with taurine.

Preferred Embodiments

Preferred structures of the reactants are as follows:

$$H-(OA)_m-NH_2 \quad (1)$$

wherein: A is either an ethylene or a propylene group, and; $m \geq 1$;

$$HO \!-\!\!\left(\! R_1\!-\!\overset{O}{\underset{\|}{C}}\!-\!O \!\right)_{\!\!x}\!\!-\!H \quad (2)$$

wherein: $R_1 = C_5\text{-}C_{30}$ alkyl or alkylene; $x \geq 1$;

$$\left[\!\left(CH\!-\!CH_2\right)_{\!k}\!\left(CH\!-\!CH\right)_{\!m}\right]_{\!n} \quad (3)$$
(with phenyl substituent on first CH, and maleic anhydride O=C-O-C=O ring on the second CH-CH)

wherein: k=1-8;
m=1; and
n is a numeral providing a co-polymer molecular weight, Mn, of 1000 to 20,000;
and $$H_nX\!-\!R_1\!-\!\overset{O}{\underset{\underset{O}{\|}}{\overset{\|}{S}}}\!-\!OY \quad (4)$$

wherein: X=N and n=2;
or X=O and n=1;
$R_1 = C_2\text{-}C_{30}$ alkyl or alkylene, or substituted or unsubstituted aromatics.
Y=H or Na.

In one preferred form, a condensate generated from the reaction of reactant (1) and reactant (2) is further reacted with the co-polymer of reactant (3) in an approximate 1:1 stoichiometric ratio, respectively, to form a condensate. More preferably, reactant (1) is monoethanolamine, reactant (2) is polyhydroxystearic acid and reactant (3) is SMA-1000.

In another preferred form, a condensate generated from the reaction of reactant (1), reactant (2), and an ω-amino or hydroxy-alkyl sulfonic acid of reactant (4) is reacted with the co-polymer of reactant (3) in an approximate 0.9:0.1:1 stoichiometric ratio, respectively, to form a condensate. More preferably, reactant (1) is monoethanolamine, reactant (2) is polyhydroxystearic acid, reactant (4) is 2-aminoethanesulfonic acid and reactant (3) is SMA-1000.

In yet another preferred form, the condensates described above are further neutralised with a suitable agent, such as NaOH.

In yet another preferred form, a condensate generated from the reaction of reactant (1), reactant (2), and a sodium salt of a ω-amino or hydroxy-alkyl sulfonic acid of reactant (4) is reacted with the co-polymer of reactant (3) in an approximate 0.9:0.1:1 stoichiometric ratio, respectively, to form a condensate. More preferably, reactant (1) is monoethanolamine, reactant (2) is polyhydroxystearic acid, reactant (4) is 2-aminoethanesulfonic acid, sodium salt and reactant (3) is SMA-1000.

EXAMPLES

Preparations

Example 1

PHSA-monoethanolamide adduct ("PHSA-MEA")

|  | g |
| --- | --- |
| PHSA | 1502 |
| Monoethanolamine | 58 |
| Xylene | 158.8 |

PHSA, pre-heated in an oven at 60° C., was charged into a 2 L flanged flask under a nitrogen atmosphere. The flask was set up as a refluxing process with a Dean-Stark trap equipped with a temperature probe and thermostatically controlled heating mantle. The flask was then charged with MEA and xylene, and the reaction mixture set to 170° C. When the acid value levelled off below 1 mg KOH/g, the reaction was deemed complete. Subsequently, the contents of the Dean-Stark trap were drained off and the product was isolated without any removal of solvent.

| Final Product: | Dark-brown, viscous liquid |
|---|---|
| Reaction Time: | 440 min. |
| Estimated MW: | 1791.3 g/mol |
| Acid Value (start): | 28.2 mg KOH/g |
| Acid Value (final): | 0.72 mg KOH/g |
| Solids: | 92.6% |
| Isolated Yield: | 1661.81 g, 96.6% |

Example 2

SMA-1000/PHSA-monoethanolamide reacted in a 1:1 stoichiometric ratio ("DS 11144")

| | g |
|---|---|
| PHSA-MEA derivative (EXAMPLE 1) | 424.10 |
| SMA-1000 | 63.14 |
| Xylene | 50.73 |
| Tetra-n-butyl titanate (TnBT) | 0.517 |

To a jacketed 1L Radley's Reactor Ready Lab Reactor, which was set up as a refluxing process with a Dean-Stark trap, equipped with a temperature probe, nitrogen inlet, general in/out port, and thermostatically controlled hot oil circulator, molten PHSA-MEA adduct, prepared as described in Example 1, was charged under a nitrogen atmosphere and the set temperature adjusted to 50° C. When the set temperature was reached, solid SMA-1000 (Polyscope Polymers BV) was added into the reactor. As the mixture in the reactor became heterogeneous, xylene was added into the Dean-Stark trap and reactor, and the reaction temperature was adjusted to 150° C. At 152° C., the reaction mixture appeared to have solubilised and the set temperature was raised to 190° C. The reaction mixture was held at 190° C. for 120 minutes and it was noted that the reaction mixture became clearer and turned from matte white to orange in colour. The reaction mixture was cooled to 150° C., then tetra-n-butyl titanate catalyst ("TnBT", Tyzor® TnBT, Dorf Ketal Chemicals, LLC) was added and the set temperature was adjusted to 205° C. The reaction mixture was held at this temperature for 232 minutes. Over this time, the product became slightly darker. The product was cooled and then isolated from the reactor flask at 93° C. as a dark-brown, orange, viscous liquid.

| Final Product: | Dark-brown, orange, viscous liquid |
|---|---|
| Reaction Time: | 628 min. |
| Acid Value (start): | 16.8 mg KOH/g |
| Acid Value (final) | 4.7 mg KOH/g |
| Solids: | 90.0% |
| Isolated Yield: | 479.8 g, 89% |
| FTIR/ATR major peaks: | 2923, 2853, 1731, 1464, 1174, 700 cm$^{-1}$ - Bruker Alpha |
| Viscosity: | Immeasurable |

Example 3

SMA-1000/PHSA-monoethanolamide/taurine reacted in a 1:0.9:0.1 stoichiometric ratio ("DS 11114")

| | g |
|---|---|
| PHSA-MEA derivative (EXAMPLE 1) | 416.46 |
| SMA-1000 | 34.30 |
| Taurine | 3.22 |
| Water | 5.09 |
| Xylene | 52.90 |
| Tetra-n-butyl titanate | 1.24 |
| NaOH, 50% aq. | 1.45 |

Into a 1 L flanged flask, which was set up as a refluxing process with a Dean-Stark trap, equipped with a temperature probe, a nitrogen inlet, a general in/out port, and thermostatically controlled heating mantle, molten PHSA-MEA adduct, prepared as described in Example 1, was charged under a nitrogen atmosphere and the temperature was set to 60° C. When the set temperature was reached, the Dean-Stark reactor was charged with taurine (Scharlau, AR Grade), that was dissolved in water with heating, along with solid SMA-1000 and washed in with xylene. The reaction temperature was increased to 150° C. and maintained at that temperature for 90 minutes followed by addition of TnBT catalyst. The set temperature was then increased to 205° C. and the reaction mixture was held at this temperature for 490 minutes. During this time period, a second amount of TnBT catalyst was added after 330 minutes. Subsequently, the sulphonic acid moiety was partially neutralised to a target level of 50% molar equivalence using aqueous sodium hydroxide and stirring for 30 minutes. The product was cooled and then isolated from the flask at 109° C. as a dark-brown, orange, viscous liquid.

| Final Product: | Dark-brown, orange, viscous liquid |
|---|---|
| Acid Value (start): | 6.64 mg KOH/g |
| Acid Value (final) | 0.95 mg KOH/g |
| Solids: | 93.5% |
| Isolated Yield: | 408.47 g, 80% |
| FTIR/ATR major peaks: | 2923, 2853, 1731, 1464, 1174, 700 cm$^{-1}$ - Bruker Alpha |
| Viscosity: | 2762 cP @ 39° C. - Brookfield, Spindle #3, RPM = 30 |

Example 4

SMA-1000/PHSA-monoethanolamide/taurine reacted in a 1:0.9:0.1 stoichiometric ratio and neutralised in-situ with NaOH ("DS 11145")

| | g |
|---|---|
| PHSA-MEA derivative (EXAMPLE 1) | 412.50 |
| SMA-1000 | 34.21 |
| Taurine | 3.17 |
| Water | 12.55 |
| Xylene | 52.47 |
| Tetra-n-butyl titanate | 1.15 |
| NaOH, 50% aq. | 1.82 |

Into a 1 L flanged flask, which was set up as a refluxing process using a Dean-Stark trap, equipped with a temperature probe, a nitrogen inlet, a general in/out port, and thermostatically controlled heating mantle, molten PHSA-MEA adduct, prepared as described in Example 1, was charged under a nitrogen atmosphere and the temperature was set to 60° C. When the set temperature was reached, taurine, which was dissolved in water with heating, was charged into the reaction flask along with solid SMA-1000 and washed in with xylene. The temperature of the reaction mixture was increased to 124° C. and maintained at reflux until it became homogeneous. The reaction temperature was increased to 150° C. and maintained at that temperature for 150 minutes followed by addition of TnBT catalyst. The set temperature was increased to 205° C. and the reaction mixture was held at this temperature for 300 minutes.

A second amount of catalyst was added and the reaction continued at a 205° C. set point for 583 minutes until the measured acid value levelled off. Subsequently, the sulphonic acid moiety was partially neutralised to a target level of 90% molar equivalence using aqueous sodium hydroxide added via syringe directly into the reactor and stirred in for 30 minutes at 193° C. The reaction mixture was then set aside to cool after which the product was isolated from the reactor flask at 108° C. as a dark-orange, viscous liquid.

| | |
|---|---|
| Final Product: | Dark Orange-coloured, viscous liquid |
| Acid Value (start): | 6.60 mg KOH/g |
| Acid Value (final) | 0.80 mg KOH/g |
| Solids: | 87.7% |
| Isolated Yield: | 416.00 g, 89% |
| FTIR/ATR major peaks: | 2923, 2853, 1731, 1464, 1174, 700 cm$^{-1}$- Bruker Alpha |
| Viscosity: | 4610 cP @ 38.5° C. - Brookfield, Spindle #3, RPM = 20 |

Example 5

SMA-1000/PHSA-monoethanolamide/sodium taurate reacted in a 1:0.9:0.1 stoichiometric ratio ("DS 11145")

| | g |
|---|---|
| PHSA-MEA derivative (EXAMPLE 1) | 482 |
| SMA-1000 | 39.47 |
| Sodium taurate | 4.36 |
| EXSSOL D60 | 22.6 |

Into a 1 L flanged flask set up as a refluxing process with Dean-Stark trap, equipped with temperature probe, nitrogen inlet and a general in/out port, molten PHSA-MEA derivative was charged under a nitrogen atmosphere and the temperature was set to 60° C. When the set temperature was reached, sodium taurate was charged into the reactor along with solid SMA-1000 and washed in with EXXSOL D60. The set temperature was set to 180° C. and the reaction mixture held at this temperature for approximately 9 to 10 hours. The reaction mixture was then set aside to cool after which the product was isolated from the reactor flask at approximately 100° C. as a dark-orange, viscous liquid.

| | |
|---|---|
| Final Product: | Brown viscous liquid |
| Acid Value (final): | 2.24 mg KOH/g |
| Solids: | 90.7% |
| Isolated Yield: | 516.2 g, 92% |

Example 6

SMA-1000/PHSA-monoethanolamide/taurine reacted in a 0.92:1.00:0.46 stoichiometric ratio and neutralised in-situ with NaOH ("DS 11146")

| | g |
|---|---|
| PHSA-MEA derivative (EXAMPLE 1) | 440.86 |
| SMA-1000 | 27.78 |
| Taurine | 13.02 |
| Water | 44.16 |
| Xylene | 56.55 |
| Tetra-n-butyl titanate | 1.07 |
| NaOH, 50% aq. | 7.49 |

A 1 L flanged flask, which was set up as a refluxing process with a Dean-Stark trap, equipped with a temperature probe, a nitrogen inlet, a general in/out port, and thermostatically controlled heating mantle was used. The flask was charged with molten PHSA-MEA adduct, prepared as described in Example 1, under a nitrogen atmosphere and the temperature was set to 60° C. The reactor was charged with taurine, dissolved in hot water, as a slurry along with solid SMA-1000 and washed in with xylene. The set temperature was to 150° C. and held for 150 minutes. TnBT catalyst was added and the temperature set to 205° C. A second amount of catalyst was added and the reaction continued at a set point of 205° C. for 610 minutes after which the measured acid value levelled off. Subsequently, the sulphonic acid moiety was part-neutralised to a target level of 90% molar equivalence using aqueous sodium hydroxide added via syringe directly into the reactor and stirred for 200 minutes at 205° C. The reaction mixture was then set aside to cool after which the product was isolated from the reactor flask at approximately 100° C. as a dark-brown-orange, viscous liquid.

| | |
|---|---|
| Final Product: | Dark-brown, orange, viscous liquid |
| Acid Value (start): | 9.64 mg KOH/g |
| Acid Value (final): | 7.40 mg KOH/g |
| Solids: | 94.5% |
| Isolated Yield: | 384.25 g, 80% |
| FTIR/ATR major peaks: | 2923, 2853, 1731, 1464, 1174, 700 cm$^{-1}$ - Bruker Alpha |
| Viscosity: | 7137 cP @ 50° C. - Brookfield, Spindle #4, RPM = 50 |

Example 7

SMA-3000/PHSA-monoethanolamide/sodium taurate reacted in a 1:0.9:0.1 stoichiometric ratio ("DS 11224")

|  | g |
|---|---|
| PHSA-MEA derivative (EXAMPLE 1) | 291.1 |
| SMA-3000 | 35.3 |
| Sodium taurate | 2.64 |
| EXXSOL D60 | 15.0 |

Into a 1 L flanged flask set up as a refluxing process with Dean-Stark trap, equipped with temperature probe, nitrogen inlet and a general in/out port, molten PHSA-MEA derivative was charged under a nitrogen atmosphere and the temperature was set to 60° C. When the set temperature was reached, sodium taurate was charged into the reactor along with solid SMA-3000 and washed in with EXXSOL D60. The set temperature was set to 180° C. and the reaction mixture held at this temperature for approximately 9 to 10 hours. The reaction mixture was then set aside to cool after which the product was isolated from the reactor flask at approximately 100° C. as a dark-orange, viscous liquid.

| | |
|---|---|
| Final Product: | Brown viscous liquid |
| Reaction Time: | 780 min. |
| Acid Value (final): | 3.40 mg KOH/g |
| Solids: | 92.0% |
| Isolated Yield: | 317.1 g, 90% |
| Viscosity: | Not measured |

Example 8

Application Examples

As per TABLE 1, evaluations were performed upon millbase concentrates to establish the fundamental performance of NADs. The millbase concentrates were prepared by addition of YUBASE 3 to an appropriate pre-mix vessel, followed by NAD, then active ingredient. The mixtures were briefly stirred using a magnetic stirrer, to form a coarse slurry. The mixture was then passed through a Laboratory Mini 100 Horizontal Mill (Engineered Mills and Mixers, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium-silicate grinding media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopic approximation. The concentrate was then used to compare NADs, including existing commercial benchmarks, the details of which are shown below in Tables 2 and 3.

TABLE 1

General Millbase Concentrate Composition

| COMPONENTS | % w/w |
|---|---|
| THIDIAZURON | 20.00 |
| NAD | 2.00-4.00 |
| SOLVESSO ® 150 | 0.00-6.12 |
| YUBASE 3 | Balance |

TABLE 2

Millbase Concentrate Compositions

| COMPONENT | Example 8A % w/w | Example 8B % w/w | Example 8C % w/w | Example 8D % w/w | Example 8E % w/w | Example 8F % w/w | Example 8G % w/w | Example 8H % w/w | Example 8I % w/w | Example 8J % w/w | Example 8K % w/w | Example 8L % w/w | Example 8M % w/w |
|---|---|---|---|---|---|---|---|---|---|---|---|---|---|
| THIDIAZURON | 20.00 | 20.00 | 20.00 | 20.00 | 20.00 | 20.00 | 20.00 | 20.00 | 20.00 | 20.00 | 20.00 | 20.00 | 20.00 |
| TERSPERSE ® 4850 | 4.00 | — | — | — | — | — | — | — | — | — | — | — | — |
| HYPERMER ® LP-3 | — | 4.00 | — | — | — | — | — | — | — | — | — | — | — |
| TERSPERSE ® 4890 | — | — | 4.00 | — | — | — | — | — | — | — | — | — | — |
| TERSPERSE ® 2510 | — | — | — | 4.00 | — | — | — | — | — | — | — | — | — |
| TERSPERSE ® 2520 | — | — | — | — | 4.00 | 2.00 | — | — | — | — | — | — | — |
| DS 11144 | — | — | — | — | — | — | 4.00 | — | — | — | — | — | — |
| DS 11114 | — | — | — | — | — | — | — | 4.00 | 4.00 | — | — | — | — |
| DS 11145* | — | — | — | — | — | — | — | — | — | 4.00 | — | — | — |
| DS 11145** | — | — | — | — | — | — | — | — | — | — | 4.00 | — | — |
| DS 11146 | — | — | — | — | — | — | — | — | — | — | — | 4.00 | — |
| DS 11224 | — | — | — | — | — | — | — | — | — | — | — | — | 4.00 |
| SOLVESSO 150 | 6.12 | 6.12 | 2.00 | 6.00 | 2.00 | 6.00 | 6.12 | — | — | 6.12 | 6.12 | 6.12 | 6.12 |
| NaOH$_{(S)}$ | — | — | — | — | — | — | — | — | 0.02 | — | — | — | — |
| YUBASE 3 | Bal. | Bal. | Bal. | Bal. | Bal. | Bal. | Bal. | Bal. | Bal. | Bal. | Bal. | Bal. | Bal. |

*DS 11145 as per Example 4
**DS 11145 as per Example 5

TABLE 3

RESULTS for Millbase Concentrate Series A

| EXAMPLE | Physical Observations of Millbase Concentrate |
|---|---|
| EXAMPLE 8A | Moderately viscous thixotropic suspension, no significant changes with time. |
| EXAMPLE 8B | Low to moderately viscous thixotropic suspension, no significant changes with time. |
| EXAMPLE 8C | Low viscosity suspension. No significant changes with time. |
| EXAMPLE 8D | Initially low viscosity, but gradually becomes viscous progressing to irreversible rigid paste. |
| EXAMPLE 8E | Initially excellent but slow progression to irreversibly gritty, pasty heterogeneous mixture. |
| EXAMPLE 8F | Initially excellent but slow progression to irreversibly gritty, pasty heterogeneous mixture. |
| EXAMPLE 8G | Low viscosity thixotropic suspension, no significant changes with time. |
| EXAMPLE 8H | Low viscosity suspension. No significant changes with time. |
| EXAMPLE 8I | Low viscosity suspension. No significant changes with time. |
| EXAMPLE 8J | Low viscosity suspension. No significant changes with time. |
| EXAMPLE 8K | Low viscosity suspension. No significant changes with time. |
| EXAMPLE 8L | Low viscosity suspension. No significant changes with time. |
| EXAMPLE 8M | Low viscosity suspension. No significant changes with time. |

Discussion of Results
Rheological Comparisons—Millbase Concentrates

Much like the related aqueous agricultural suspension concentrate ("SC"), an OD formulation can also be preferentially formulated via the preparation of a millbase concentrate. For an SC or OD formulation to be commercially feasible, its millbase concentrate needs to be of a suitably low viscosity to allow for efficient comminution, and generally free of rheological phenomena, such as excessive thixotropy or dilatancy, which tend to lead to production inefficiencies or even failures.

A low millbase concentrate viscosity tends to reflect efficient dispersing agent performance, where said performance is of course not only critical to efficient grinding, but is a key pillar of the stabilisation of complete formulated concentrated suspensions as a whole. Particularly for the case of agricultural OD formulations, however, the inventors have discovered that obtaining suitably low viscosity millbase concentrates, or millbase concentrates which are satisfactorily stable as determined by way of observing agglomerative and Theological behaviours, is generally challenging. The inventors postulate that the underlying deficiency in agrochemical NAD technology and the specific challenge it creates, is a key element which has limited the growth of non-aqueous OD formulation technology.

Conveniently, the characterisation of fundamental NAD performance in a given oil/solvent mixture can be approached by means of simple visual and rheological assessment of millbase concentrates. The advantage of this method is that the concentrate will often be free of the significant complexity arising from the presence of other key formulation elements, such as emulsifying and rheology modifying agents.

In this instance, a simple visual assessment was performed within 24 hours of preparation of the millbase concentrate, followed by general re-examination in subsequent weeks. Rheological experiments were performed via a Malvern Kinexus Pro Rheometer using a 40 mm stainless steel parallel plate geometry at 150 µm gap at a fixed temperature of 25° C. Rheological experiments were limited to simple flow curves evaluating shear viscosity versus shear rate. It can be envisaged that variation in the effectiveness of an NAD will impact the rheological characteristics of a dispersion through changes in particle-particle dynamics. These behaviours can be probed through use of a rheometer, either through flow-type or oscillatory measurements.

In this case, the inventors found that the plant growth regulator, thidiazuron, consistently displayed the same indicative features of poor dispersant performance attributable to deficient technology, which had previously been observed when attempting to develop OD formulations containing other pesticidal active ingredients. However, the key utility of thidiazuron for the assessment of potentially universal NAD performance was that these features were accompanied by readily observable rheological anomalies, particularly unwanted thixotropy. These changes were easily quantified by more simple flow assessments where even small decreases in NAD performance were readily observed as order of magnitude increases in low-shear viscosity.

Figure 2:
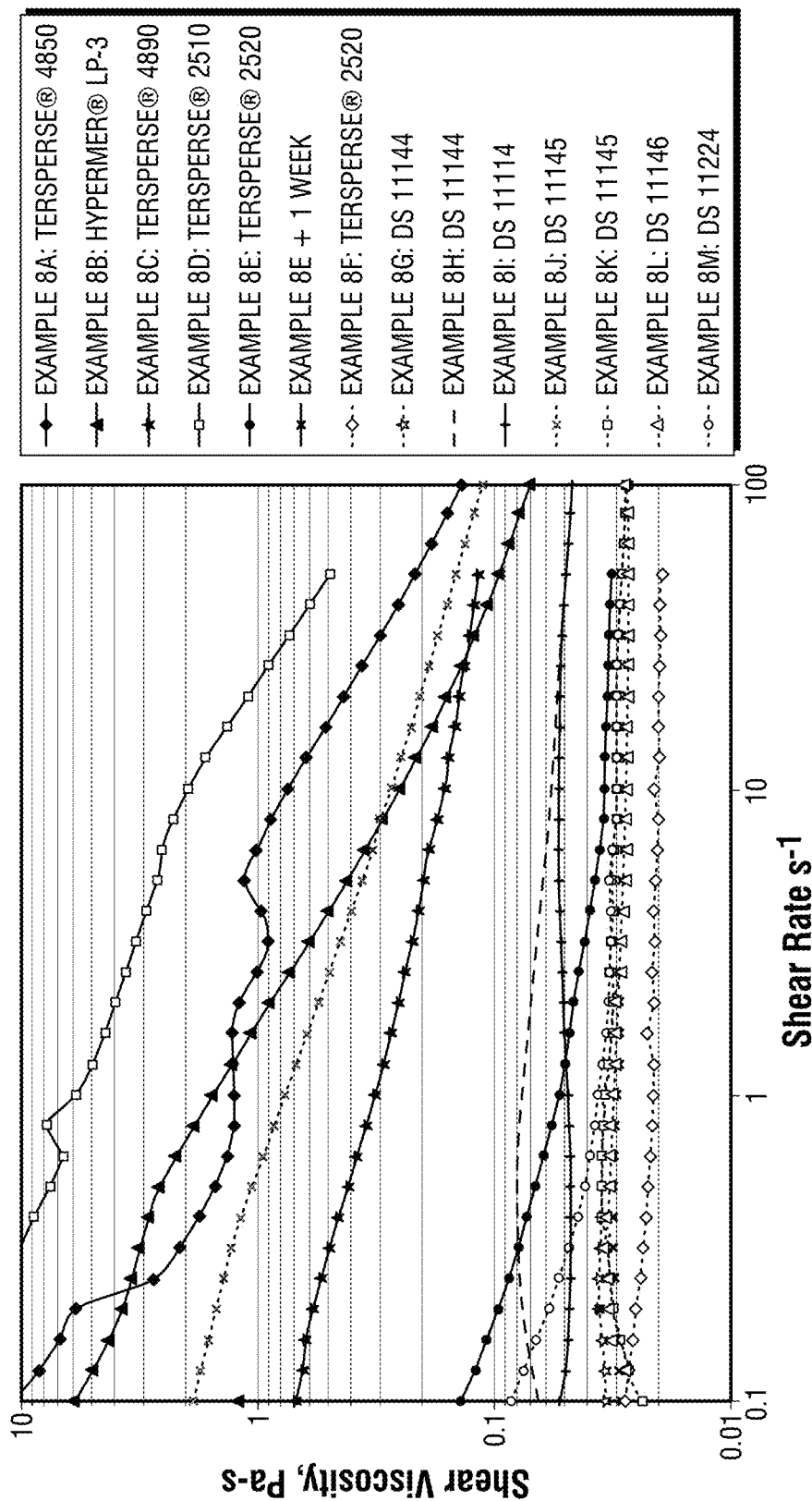
FIG. 2 is an expanded or zoomed-in view of FIG. 1.
Figure 3A:
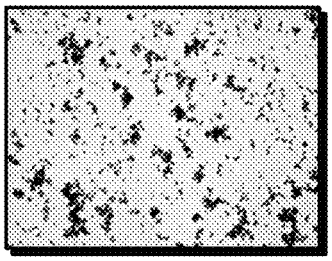
FIG. 3 depicts photomicrographic imagery of primary Millbase Concentrate Series A at 20 times magnification.
Figure 3B:
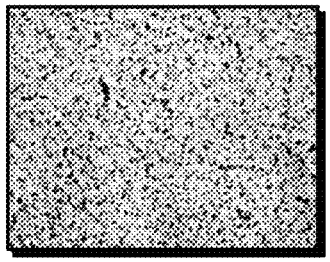
Figure 3C:
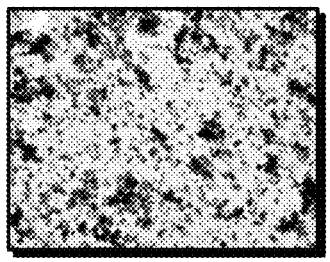
Figure 3D:
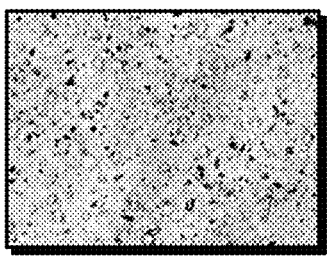
Figure 3E:
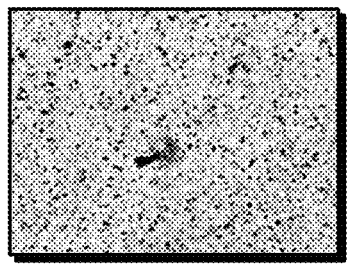
Figure 3F:
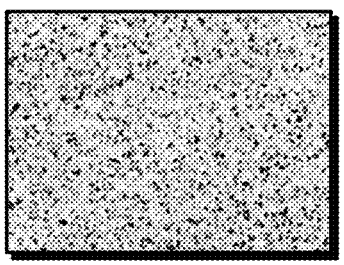
Figure 3G:
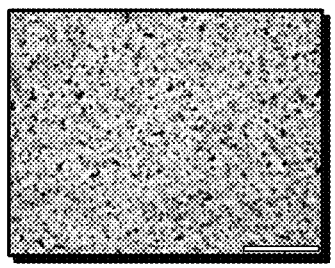

FIG. 1 and FIG. 2 show the correlation between improved NAD performance and significantly decreased shear viscosities. It is immediately apparent that use of existing accessible technology, such as TERSPERSEO 2510, TERSPERSE® 4850 and HYPERMER® LP-3 yields unsuitable viscosities, which were attributable to flocculation, as illustrated by FIG. 3. Other accessible technologies, such as TERSPERSE® 2520 and TERSPERSE® 4890, however, do manage to provide effective performance and significant reduction of thixotropy. However, the former deteriorates as a function of time as is illustrated by EXAMPLE 8E, while the latter fails to meet the criteria of a low-risk polymer, which restricts the commercial viability of this and related technology.

The surprisingly enhanced NAD performance attributable to a relative decrease in amphipathic character through use of the SMA backbone is first shown by EXAMPLE 8G (DS 11144). DS 11144, albeit a notional comb-type graft co-polymer was expected to be functionally similar to the more traditional A-B-type dispersant TERSPERSE® 4850 based on comparison of relative anchoring group similarities, although low-shear viscosity was reduced by a factor of 4 to 5.

EXAMPLES 8H through to 8M show the marked improvement achieved through further derivatisation by way of the co-condensation of taurine. Use of DS11114, DS11145, DS11146 and DS11124 each provide effective removal of problematic thixotropy and performance on par with the benchmark TERSPERSE® 4890. More specifically, all four NADs were expected to be functionally similar to the benchmark anionic NAD, HYPERMER® LP-3, again based on simple comparison of anchoring chemistry, where HYPERMER® LP-3 is markedly more amphiphilic, and where ionic character was shown to be very influential with respect to overall performance, as evidenced by comparing the flow curves of EXAMPLE 8I1 and 8I. Comparatively though, DS11114, DS11145, DS11146 and DS11224 decreased viscosity by a factor of roughly 200, again highlighting the surprising effect of decreasing the notional amphipathic character through utilisation of the SMA backbone.

Additionally, the relatively strong performance of DS 11224 as illustrated by EXAMPLE 8M, further highlights the surprising efficacy of the SMA-anchor, where the 3-fold increase of backbone styrene content by way of substituting SMA-1000 with SMA-3000, and the subsequent additional decrease in amphipathic character were expected to yield a significant performance loss.

Microscopy

As described above, the rheological phenomena directly correlated to the presence of flocculation, which is attributed to deficient dispersant performance.

This correlation is visually observable by way of FIG. 3, which exhibits photomicrographic imagery of the millbase concentrates. Photomicrography was achieved by an Olympus BX43 Microscope fitted with an attached camera system. Millbase concentrates were observed by first diluting 3 to 4 drops of the suspension to be observed in approximately 10ml of YUBASE 3. The sample was then briefly agitated, then carefully added dropwise on to an appropriately sized glass slide and covered carefully with a cover slip.

In support of the rheological assessment, photomicrographs of EXAMPLES 8H, 8J, 8L and 8M, using DS 11114, DS 11145, DS 11146 and DS 11224, respectively, clearly illustrates the relative increase in performance of the materials attributable to an elimination of flocculation owing to the surprising efficacy of the SMA-based anchoring moiety.

Where the terms "comprise", "comprises", "comprising", "include", "includes", "included" or "including" are used in this Specification, they are to be interpreted as specifying the presence of the stated features, integers, steps or components referred to, but not to preclude the presence or addition of one or more other feature, integer, step, component or group thereof.

Further, any prior art reference or statement provided in the Specification is not to be taken as an admission that such art constitutes, or is to be understood as constituting, part of the common general knowledge.

One of ordinary skill in the art will appreciate that materials and methods, other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by examples, preferred embodiments and optional features, modification and variation of the concepts herein disclosed can be resorted to by those skilled in the art, and that such modifications and variations are considered to be within the scope of this invention as defined by the appended claims.

The invention claimed is:

1. A non-aqueous dispersant (NAD) comprising a condensate formed by the grafting of an adduct of a hydrophobic stabilising entity (HSE) selected from the group consisting of polyhydroxystearic acid (PHSA), polyisobutylene succinic anhydride (PIBSA), and polycaprolactone with a linker substrate selected from the group consisting of a glycol, an alkanolamine, an ether amine, and an ethylene amine onto a co-polymer, wherein the co-polymer comprises a styrene-maleic anhydride (SMA) co-polymer.

2. The non-aqueous dispersant according to claim 1, wherein the HSE is PHSA having a molecular weight (Mn) of greater than 1000 Da.

3. The non-aqueous dispersant according to claim 1, wherein the condensate is anionic and/or acidic.

4. The non-aqueous dispersant according to claim 1, wherein the SMA co-polymer has a styrene:maleic anhydride stoichiometric ratio range of from 1:1 to 3:1.

5. The non-aqueous dispersant according to claim 1, wherein the condensate is formed by the reaction of the SMA co-polymer and the adduct of the HSE in a stoichiometric ratio range of from 1:2 to 8:1 and in a molecular weight (Mn) range of 1,000 to 40,000 Da.

6. The non-aqueous dispersant according to claim 1, wherein the linker substrate is selected from the group consisting of a polyoxyalkylene, monoethylene glycol (MEG), diethylene glycol (DEG), triethylene glycol (TEG), polyethylene glycol (PEG), a polyoxyalkylene, wherein in the formula HO[-$CH_2$-CH-R-O-]$_n$-H, (R=H or $CH_3$) and n=1-100, a glycolamine, diglycolamine (DGA), triglycolamine (TGA), a polyetheramine, 4-hydroxyaniline, monoethanolamine (MEA), monoisopropanolamine (MIPA), ethylenediamine (EDA), triethylenetetramine (TETA), and tetraethylenepentamine (TEPA).

7. The non-aqueous dispersant according to claim 1, wherein the linker substrate comprises a polyetheramine selected from the group consisting of an amine terminated polyoxypropylene, and a diamine with a predominantly polyethylene glycol backbone having a terminal amine.

8. The non-aqueous dispersant according to claim 1, wherein the PHSA is modified by the following reaction with a reactant selected from the group consisting of N-hydroxyethyl(meth)acrylamide (HEAA), N-hydroxyethyl methacrylamide (HEMAm), 2-hydroxyethyl acrylate (HEA), 2-hydroxyethyl methacrylate (HEMA), 4-vinylaniline, 4-vinylphenol, an allylalcohol, and an allylamine; and
  wherein the adduct is a macromonomer having an ethylenically unsaturated terminus.

9. The non-aqueous dispersant according to claim 1, wherein the linker substrate is monoethanolamine and wherein the adduct is PHSA-monoethanolamide.

10. The non-aqueous dispersant according to claim 9, wherein the PHSA used in the reaction with monoethanolamine to form the PHSA-monoethanolamide adduct has a molecular weight of greater than 1000 g/mol as determined by an acid value of about 25 to 50 mg KOH/g.

11. The non-aqueous dispersant according to claim 1, wherein the condensate further comprises a sulphonic acid functionality.

12. The non-aqueous dispersant according to claim 11, wherein the sulphonic acid functionality is selected from the group consisting of taurine, isethionic acid, 4-aminobenzenesulphonic acid, 4-hydroxybenzenesulphonic acid 1-hydroxy-2-propanesulfonic acid, and their respective salts.

13. The non-aqueous dispersant according to claim 12, wherein the sulphonic acid-functionality is taurine or its salt and wherein a SMA:PHSA-monoethanolamide:taurine co-polymer is formed.

14. The non-aqueous dispersant according to claim 13, wherein the stoichiometric ratio of the SMA:PHSA-monoethanolamide:taurine co-polymer is 1:0.9:0.1.

15. The non-aqueous dispersant according to claim 13, wherein the stoichiometric ratio of the SMA:PHSA-monoethanolamide:taurine co-polymer is 0.92:1.00:0.46.

16. The non-aqueous dispersant according to claim 14, wherein the reaction mixture is neutralised with an alkaline/basic reagent.

17. The non-aqueous dispersant according to claim 16, wherein the alkaline/basic reagent is NaOH.

* * * * *